(12) United States Patent
Al Sayeed et al.

(10) Patent No.: US 11,057,146 B2
(45) Date of Patent: *Jul. 6, 2021

(54) VIRTUALIZED SECTIONS FOR SECTIONAL CONTROL OF OPTICAL LINKS

(71) Applicant: Ciena Corporation, Hanover, MD (US)

(72) Inventors: Choudhury A. Al Sayeed, Stittsville (CA); Mark Hinds, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/662,221

(22) Filed: Oct. 24, 2019

(65) Prior Publication Data

US 2020/0059315 A1 Feb. 20, 2020

Related U.S. Application Data

(63) Continuation of application No. 15/719,741, filed on Sep. 29, 2017, now Pat. No. 10,941,324.

(51) Int. Cl.
*H04B 10/079* (2013.01)
*H04J 14/02* (2006.01)

(52) U.S. Cl.
CPC ...... *H04J 14/0287* (2013.01); *H04J 14/0201* (2013.01); *H04B 10/07955* (2013.01); *H04J 2203/006* (2013.01)

(58) Field of Classification Search
None
See application file for complete search history.

(56) References Cited

U.S. PATENT DOCUMENTS

| 5,491,572 | A | * | 2/1996 | Ohara | H04B 10/0799 398/15 |
|---|---|---|---|---|---|
| 5,654,816 | A | * | 8/1997 | Fishman | H04B 10/07 359/349 |
| 6,047,331 | A | | 4/2000 | Medard et al. | |
| 6,937,821 | B1 | * | 8/2005 | Heath | H04B 10/077 398/38 |
| 7,747,165 | B2 | | 6/2010 | Emery et al. | |
| 7,756,417 | B2 | * | 7/2010 | Takeuchi | H04J 14/0227 398/17 |
| 8,208,481 | B2 | | 6/2012 | Ellis et al. | |
| 8,254,780 | B2 | * | 8/2012 | Mizutani | H04B 10/03 398/24 |

(Continued)

OTHER PUBLICATIONS

Mehdi, Von Neumann Architecture, 2012 (Year: 2012).*

*Primary Examiner* — Jai M Lee
(74) *Attorney, Agent, or Firm* — Clements Bernard Walker; Lawrence A. Baratta, Jr.; Christopher L. Bernard

(57) ABSTRACT

Systems and methods are implemented at an Optical Add/Drop Multiplexer (OADM) node using virtual sections to provide sectional control over an optical link over a foreign-controlled optical network. The systems and methods include obtaining and storing a first power spectral density snapshot of an optical link, from an optical spectrum monitor and when the optical link is in a non-fault condition; responsive to detection of a fault on channels traversing the optical link, obtaining a second power spectral density snapshot at a receiving end of the optical link; analyzing the first power spectral density snapshot and the second power spectral density snapshot; and determining the fault is on the optical link based on the analyzing.

20 Claims, 8 Drawing Sheets

(56) References Cited

U.S. PATENT DOCUMENTS

| | | | |
|---|---|---|---|
| 8,305,877 B2 * | 11/2012 | Sabet | H04J 14/0227 370/216 |
| 8,306,427 B2 | 11/2012 | Goto et al. | |
| 8,520,685 B2 | 8/2013 | Nagata et al. | |
| 8,682,157 B2 * | 3/2014 | Izumi | H04J 14/0246 398/5 |
| 9,172,475 B2 * | 10/2015 | Zhang | H04B 10/2935 |
| 9,276,696 B2 * | 3/2016 | Al Sayeed | H04J 14/0221 |
| 9,577,763 B2 | 2/2017 | Al Sayeed et al. | |
| 10,038,494 B1 | 7/2018 | Paraschis et al. | |
| 10,050,737 B1 | 8/2018 | Al Sayeed et al. | |
| 10,491,324 B2 * | 11/2019 | Al Sayeed | H04J 14/0201 |
| 2001/0048537 A1 * | 12/2001 | Sussman | H04B 10/0795 398/10 |
| 2002/0015199 A1 | 2/2002 | Eder et al. | |
| 2003/0020994 A1 | 1/2003 | Boden | |
| 2003/0185567 A1 | 10/2003 | Kurumida et al. | |
| 2004/0047628 A1 * | 3/2004 | Passier | H04J 14/0221 398/15 |
| 2004/0146306 A1 | 7/2004 | Muzicant et al. | |
| 2004/0170429 A1 | 9/2004 | Mahlab et al. | |
| 2004/0190901 A1 | 9/2004 | Fang et al. | |
| 2004/0208553 A1 * | 10/2004 | Yang | H04B 10/0773 398/54 |
| 2004/0218919 A1 | 11/2004 | Hunsche et al. | |
| 2005/0078957 A1 * | 4/2005 | Hendow | H04J 14/02 398/33 |
| 2005/0185954 A1 * | 8/2005 | Sadananda | H04B 10/032 398/5 |
| 2006/0127086 A1 | 6/2006 | Frankel et al. | |
| 2006/0216038 A1 * | 9/2006 | Yokota | H04B 10/0797 398/177 |
| 2006/0269284 A1 | 11/2006 | Fujita | |
| 2007/0019904 A1 | 1/2007 | Bulow | |
| 2007/0280700 A1 | 12/2007 | Remedios et al. | |
| 2008/0304822 A1 * | 12/2008 | Bianchi | H04J 3/14 398/2 |
| 2009/0016727 A1 | 1/2009 | Ueki et al. | |
| 2009/0290870 A1 * | 11/2009 | Koyano | H04B 10/07955 398/25 |
| 2010/0067901 A1 * | 3/2010 | Mizutani | H04B 10/03 398/20 |
| 2010/0142943 A1 | 6/2010 | Frankel et al. | |
| 2011/0058806 A1 * | 3/2011 | Sabet | H04L 41/0631 398/1 |
| 2014/0112660 A1 | 4/2014 | Al Sayeed et al. | |
| 2014/0328583 A1 | 11/2014 | Al Sayeed et al. | |
| 2015/0117858 A1 | 4/2015 | Al Sayeed et al. | |
| 2015/0318948 A1 | 11/2015 | Kerfoot, III et al. | |
| 2017/0085316 A1 | 3/2017 | Al Sayeed et al. | |
| 2017/0099530 A1 | 4/2017 | Swinkels et al. | |
| 2017/0104551 A1 | 4/2017 | Charlet et al. | |
| 2017/0117983 A1 * | 4/2017 | Al Sayeed | H04J 14/0221 |
| 2018/0343078 A1 * | 11/2018 | Roberts | H04J 14/0275 |

* cited by examiner (A) SAMPLE NETWORK (B) VIRTUAL OMS LINK MAPPING WITH VRBUS

VIRTUALIZED SECTIONS FOR SECTIONAL CONTROL OF OPTICAL LINKS

CROSS-REFERENCE TO RELATED APPLICATION(S)

The present disclosure is a continuation of U.S. patent application Ser. No. 15/719,741, filed Sep. 29, 2017, and entitled "Virtualized sections for sectional control of optical links," the contents of which are incorporated herein by reference.

FIELD OF THE DISCLOSURE

The present disclosure generally relates to fiber optic systems and methods. More particularly, the present disclosure relates to virtualized sections for sectional control of optical links, such as for submarine optical links, third-party optical networks with Optical Add/Drop Multiplexers (OADMs), and the like.

BACKGROUND OF THE DISCLOSURE

In optical networks, optical control (e.g., for power, Optical Signal-to-Noise Ratio (OSNR), etc.) is generally performed on a section in the optical network. A section is an optical link with no optical add/drop between two nodes, i.e., the section is defined between optical add/drop points. Thus, the optical link in the section has the same number of channels at ingress and egress, which is advantageous for sectional control via a sectional controller. In the overall network, control is performed through various techniques known in the art for each section. See, e.g., U.S. Pat. No. 9,577,763, issued Feb. 21, 2017, and entitled "SPECTRUM CONTROLLER SYSTEMS AND METHODS IN OPTICAL NETWORKS," the contents of which are incorporated by reference herein. Sectional optical controllers run with a fundamental assumption that the spectral loading within the section remains unchanged and based on that, the sectional controllers run all their optimization applications such as optimizing power or incremental OSNR. One particular constraint in conventional section control-based schemes is the assumption the sectional controller has visibility of the optical components, to be able to determine where the sections are. Of course, this is the case in a single vendor deployment. However, this is not the case with submarine systems, third-party optical networks, and the like. In such other deployments, sectional control is difficult or impossible to implement since the sectional controller simply does not have visibility of the underlying optical components and does not know how many sections there are between two add/drop nodes.

For example, in a subsea (also known as a submarine) optical network, the optical components under the sea are typically left as self-controlled. That is, the long chain of optical amplifiers run control operations (typically total optical output power or constant pump current controlled) on their own. The Reconfigurable Optical Add/Drop Multiplexers (ROADMs) are typically located at the landing stations at the two ends of the submarine cable and provide the optical channel add/drop functions and further branching to remote terrestrial networks. The ROADM terminals at the two ends of the submarine cable typically do not maintain any direct control communication with the long chain of optical amplifiers that is primarily due to the unavailability of any Optical Service communication Channel (OSC) between the ROAMs and the subsea-amplifiers, and due to the fact, that often service providers deploy ROADM terminals and subsea-amplifiers from different optical vendors who do not communicate in the same format, nor in the same communication channel.

In a typical submarine network, submarine cables with a long-chain of amplifiers usually run unprotected. This is usually due to the fact that submarine cables, as laid down under the sea, do not see the usual fiber cut disturbance as a typical terrestrial optical fiber cable would see. However, if for any reason, a subsea fiber cut takes place, the communication disruption becomes enormous, and typically, it takes weeks to months to repair such fiber faults. In order to overcome such expensive traffic disruption, in some submarine networks, service providers are planning to place optical Branching Units (BUs) under the sea so that if a fiber cut takes place within a portion of a protected submarine cable, then traffic can be automatically re-routed using the optical branching unit to other subsea cable routes.

There are various challenges associated with interoperation between the ROADMs and the submarine optical system. Also, these same challenges are seen in the case of ROADMs operating on third-party optical networks, i.e., third-party optical components including OADMs between the two ROADMs. A first challenge is how the ROADM terminals located at the edge of submarine cables (or third-party optical network) can detect any fiber break, or foreign equipment failure within the foreign-controlled submarine territory (or third-party optical network), and in the absence of any optical supervisory communication channel. Note, in this case, the submarine links add a discrete challenge for not creating a loss of light indication at the receiving end of the subsea link due to the presence of high Amplified Stimulated Emission (ASE). A second challenge is how the Layer 0 control plane that is responsible for maintaining the routing and end-to-end channel topology, can detect the automatic reconfiguration of channels from the faulted cable to one of the other non-faulted branching paths as maintained and controlled by the foreign reconfigurable/fixed optical branching units, and again with or without any per channel reconfiguration notifications from the foreign BUs to the ROADM terminals.

A third challenge, based on the first and second challenges, is how the Layer 0 control plane can reroute any "mesh restorable" channels from the faulted cable to another restoration path (since it is possible that not every channel on the faulted path may not have the policy to be mesh-restorable), where the re-routing scheme involves clearing channel topology from the faulted cable, re-creating end-to-end channel topology between source and destination points over the other possible restoration paths in the network, including the under-the-sea branching path, where the channel is automatically re-routed by the foreign BUs, and if necessary, retuning the channel at a different frequency in case there is a spectrally flexible reconfigurable subsea BUs.

As sectional controllers are well known and work effectively, there is a desire to extend their benefits to optical links which are not necessary well-defined sections. Specifically, the connectivity between the ROADMs described above over the submarine optical network or the third-party optical network is not a defined section with the presence of BUs or OADMs and without visibility by the ROADMs, and it would be advantageous to extend the benefit of sectional control thereto.

BRIEF SUMMARY OF THE DISCLOSURE

In an embodiment, a method, implemented at an edge Optical Add/Drop Multiplexer (OADM) node, for using virtual sections to provide sectional control over an optical link over a foreign-controlled optical network includes virtually splitting the optical link at a shelf processor associated with the edge OADM node; in a non-fault condition, obtaining and storing a power snapshot of the optical link and associated virtual sections thereon, from an optical spectrum monitor; responsive to a fault on one or more virtual sections of the virtual sections, obtaining a current power snapshot of the optical link and the associated virtual sections; and comparing the stored power snapshot and the current power snapshot of the one or more virtual sections and providing a fault alarm for the one or more virtual sections based on the comparing to a control plane for management thereof. The method can further include implementing a sectional controller over the optical link via a plurality of controller sub-instances for each of the virtual sections. The plurality of controller sub-instances can communicate to adjacent controller sub-instances at a plurality of OADM nodes over the foreign-controlled optical network, for sectional control of associated virtual sections. The foreign-controlled optical network can include a submarine optical network with Total Output Power (TOP) control of associated amplifiers, such that the plurality of controller sub-instances have minimal interdependence.

The foreign-controlled optical network can include a submarine optical network including at least one branching unit configured to switch the optical link without coordination with the edge OADM node. The foreign-controlled optical network can include a terrestrial optical network including at least one intermediate OADM which does not have supervisory communication with the edge OADM node. The comparing step can include cross-correlation of the stored power snapshot and the current power snapshot. Responsive to the fault on one or more virtual sections, the foreign-controlled optical network can be configured to re-route channels based on the fault, and the method can further include rediscovering the re-routed channels based on the comparing. The virtually splitting can include utilizing one of a virtual module, virtual ports at the edge OADM node shelf processor, and virtual OADM nodes in the control plane to represent the optical link and virtual degrees for each of the virtualized sections. The virtually splitting for each virtualized section can model propagation characteristics of the optical link, including fiber loss, Raman amplification, gain ripple, and gain tilt.

In another embodiment, an edge Optical Add/Drop Multiplexer (OADM) node configured to use virtual sections to provide sectional control over an optical link over a foreign-controlled optical network includes an optical spectrum monitor configured to monitor the optical link; and a shelf processor communicatively coupled to the optical spectrum monitor, wherein memory storing instructions that, when executed, cause the shelf processor to virtually split the optical link at a shelf processor associated with the OADM node; in a non-fault condition, obtain and store a power snapshot of the optical link and associated virtual sections thereon, from the optical spectrum monitor; responsive to a fault on one or more virtual sections of the virtual sections, obtain a current power snapshot of the optical link and the associated virtual sections; and compare the stored power snapshot and the current power snapshot of the one or more virtual sections and provide a fault alarm for the one or more virtual sections based on the comparing to a control plane for management thereof. The memory storing instructions that, when executed, can further cause the shelf processor to implement a sectional controller over the optical link via a plurality of controller sub-instances for each of the virtual sections.

The plurality of controller sub-instances can communicate to adjacent controller sub-instances at a plurality of OADM nodes over the foreign-controlled optical network, for sectional control of associated virtual sections. The foreign-controlled optical network can include a submarine optical network with Total Output Power (TOP) control of associated amplifiers, such that the plurality of controller sub-instances have minimal interdependence. The foreign-controlled optical network can include a submarine optical network including at least one branching unit configured to switch the optical link without coordination with the OADM node. The foreign-controlled optical network can include a terrestrial optical network including at least one intermediate OADM which does not have supervisory communication with the edge OADM node.

The stored power snapshot and the current power snapshot can be compared through a cross-correlation. Responsive to the fault on one or more virtual sections, the foreign-controlled optical network can be configured to re-route channels based on the fault, and wherein the memory storing instructions that, when executed, can further cause the shelf processor to rediscover the re-routed channels based on the comparing. The virtually split can utilize one of a virtual module, virtual ports at the shelf processor, and virtual OADM nodes in the control plane to represent the optical link and virtual degrees for each of the virtualized sections.

In a further embodiment, an optical network with virtual sections to provide sectional control over a foreign-controlled optical links includes a plurality of Optical Add/Drop Multiplexer (OADM) nodes interconnected to one another via a plurality of optical links, wherein the plurality of optical links include at least one foreign-controlled optical link; wherein the plurality of OADMs implement a control plane for management thereof; and wherein the plurality of OADMs virtually model the at least one foreign-controlled optical link in the control plane through a shelf processor at each OADM configured to, in a non-fault condition, obtain and store a power snapshot of the at least one foreign-controlled optical link and associated virtual sections thereon, from an optical spectrum monitor; responsive to a fault on one or more virtual sections of the virtual sections, obtain a current power snapshot of the at least one foreign-controlled optical link and the associated virtual sections; and compare the stored power snapshot and the current power snapshot of the one or more virtual sections and provide a fault alarm for the one or more virtual sections based on the comparing to the control plane.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
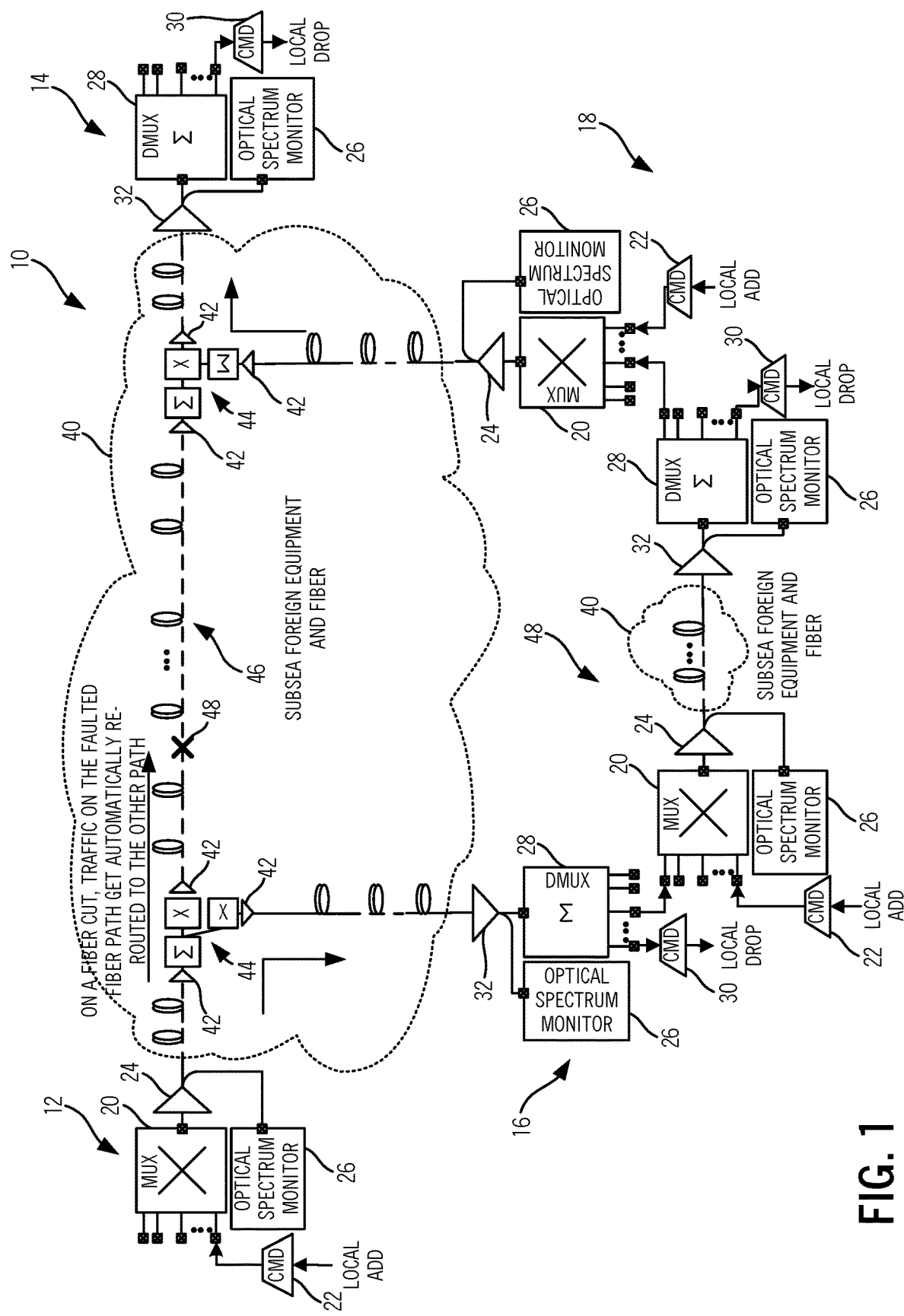
FIG. 1 is a network diagram of a submarine optical network with Optical Add/Drop Multiplexer (OADM) terminals connected thereto.

In various embodiments, the present disclosure relates to systems and methods for virtualized sections for sectional control of optical links, such as for submarine optical links, third-party optical networks with Optical Add/Drop Multiplexers (OADMs), and the like. The systems and methods are designed for submarine optical links and other third-party optical networks that typically contain OADM nodes at the edge of the link, while all other optical components within the link remain foreign-controlled (i.e., each photonic component may have its own local control, but there is no in-band or out-of-band supervisory communication between those photonic components and the edge OADM nodes).

While submarine links are very much linear and run unprotected with no additional channel add/drops (i.e., spectral loading within the link does not change), in some recent proposed deployments, vendors are planning to deploy optical BUs to reroute traffic through other links in case of fiber faults, traffic redirection, etc. within a given submarine link. Although the BUs do not have channel add/drop capability, such insertion of locally controlled or foreign-controlled BUs with no additional supervisory communication with the edge OADMs breaks certain long-standing assumptions related to sectional control. Typically, for a submarine link, the edge OADM nodes and its sectional controllers maintain the control and routing communications with the upper layer control planes, and remain responsible for maintaining per channel target launch powers into the submarine link.

In the systems and methods, the link can include multiple BUs in the middle of the subsea link, a single submarine link, which had been treated as a single optical section with no spectral loading changes within the section, can now have different spectral loadings at different segments of the section as BUs become reconfigurable. Typically, due to a substantial amount of ASE generation on the submarine link where the foreign-controlled optical amplifiers can operate in total target output power control mode, each edge OADM node cannot detect a fiber fault in the submarine link in the conventional way (i.e., the pre-amplifiers on the OADM nodes may not go into shutoff state due to high ASE). Additionally, due to the lack of supervisory communication between the BUs and the edge OADM nodes, when the foreign-/locally-controlled BUs start re-routing channels from the faulted link to other possible degrees, the edge OADM nodes cannot detect such channel routing modifications, and hence cannot notify a centralized or a distributed control plane to take care of the overall end-to-end mesh-restoration of channels in case of fiber faults. The same scenario applies to third-party terrestrial links with reconfigurable OADM elements in the path, that are not directly visible to or managed by the edge OADM nodes and the related control plane nodes.

The systems and methods address these network protection issues. In summary, a Virtual Reconfigurable Branching Unit (vRBU) or Virtual OADM (vOADM) (i.e., a virtualized representation of optical components in the submarine optical network or the third-party optical network) is proposed that is essentially a software construct or object model that can be added to each edge OADM node's line facing degree ports to model the branching or re-routing functionalities of the foreign-controller branching units (BUs) or third-party OADMs. Each vRBU/vOADM can be used to model the routing functionalities for a single nodal degree to N number of far-end OADM nodal degrees. Each virtual branching port of the vRBU/vOADM also splits the typical edge OADM sectional controllers to a controller sub-instance that provides control and monitoring functionalities for all channels routed only from that nodal virtual port associated with another virtual port at the far-end. In other words, the vRBU/vOADM on each edge OADM node creates a virtual route or logical sub-sections within the Optical Multiplex Section (OMS) and restores the conventional assumptions of no change in spectral loading conditions within a given logical sub-section. In addition, the vRBU/vOADM provides an option to model the total accumulated propagation characteristics such as fiber loss, Raman amplification, amplifier gain ripple and tilt from a line facing degree point to the far-end OADM nodal degree point. With the help of the vRBU/vOADM and their virtual routes, the control plane manages to map out inter-node connectivity between the edge OADM nodes over the submarine link or third-party optical network.

In addition, a process is presented for the Layer 0 control plane to detect fiber faults over the foreign-controlled fiber link by taking the Loss of Frame (LOF) or Loss of Clock (LCK) detection for all channels routed within a virtual link, detecting non-fault condition for all the other supervised links within the route, and by correlating a power profile snapshot (i.e., a power snapshot) taken by logical sub-section controllers' reported in power spectral density format in terms of before and after the fault detected at the receivers (Rx's).

Advantageously, the systems and methods use virtual equipment and port mapping to split a single section (i.e., the submarine optical network or the third-party optical network) into multiple logical sub-sections that can control and monitor channels only within that sub-section. That is, the systems and methods logically split a single OMS into multiple virtual links or virtual tunnels where each tunnel represents a logical sub-section. The systems and methods allow a control plane to detect fiber faults and manage routing for restoration over a foreign-controlled submarine or terrestrial link that has no supervisory communication or, in other words, no integrated communication interface with edge control nodes (OADMs). Due to the presence of high ASE in submarine links, it takes special fault correlation between receivers in a virtual link, faults in supervised links and cross-correlations of spectral power snapshots measured from foreign-controlled submarine links in order to isolate the fault to a particular branched-link.

Optical Network

FIG. 1 is a network diagram of a submarine optical network 10 with OADM terminals 12, 14, 16, 18 connected thereto. For illustration purposes, the OADM terminals 12, 14, 16, 18 are illustrated in a unidirectional configuration, but those skilled in the art will recognize the same components can be included in an opposite direction to provide a bidirectional configuration. In this example, the OADM terminal 12 is configured to transmit, the OADM terminal 14 is configured to receive, and the OADM terminals 16, 18 are configured to both transmit and receive. The OADM terminals 12, 16, 18 include a multiplexer 20 configured to receive one or more optical channels, including locally added channels, such as via a channel multiplexer 22. On the line side after the multiplexer 20, the OADM terminals 12, 16, 18 include an amplifier 24 which can include a tap on an output connected to an optical spectrum monitor 26, e.g., an Optical Channel Monitor (OCM), etc. The OADM terminals 14, 16, 18 include a demultiplexer 28 configured to provide one or more optical channels, including locally dropped channels, such as via a channel demultiplexer 30. On the line side prior to the demultiplexer, the OADM terminals 14, 16, 18 include an amplifier 32 which can include a tap on an output connected to an optical spectrum monitor 26. The multiplexer 20 and the demultiplexer 28 can be a Wavelength Selective Switch (WSS), combiner, splitter, etc. The optical spectrum monitor 26 includes an optical detector which is configured to monitor the output/input from the amplifiers 24, 32.

The OADM terminals 12, 14, 16, 18 are connected to one another via a foreign-controlled optical network 40. The foreign-controlled optical network 40 in this example is a submarine optical network but could be any foreign-controlled optical network including a terrestrial third-party optical network. The foreign-controlled optical network 40 includes optical amplifiers 42 and other components omitted for illustration purposes. Also, the foreign-controlled optical network 40 includes branching units 44. The branching units 44 can be submarine optical BUs, third-party OADMs, etc. For example, for the submarine optical BUs, the branching units 44 have no local add/drop capabilities. Here, the branching units 44 can have fixed optical filters for different branches so that channels only within a fixed set of spectral ranges can be re-routed to a given degree. Some branching units 44 can have reconfigurable capability as well so that a specific channel or given spectral range can be re-routed from one degree to another. These subsea reconfigurable BUs can be pre-programmed or periodically re-programmed to re-route specific set of channels from one branch to another if an optical fiber break is detected on a given branch. However, again, with this whole protection scheme, the subsea BUs can detect fiber breaks on their own and start re-routing traffic to other branching paths, while the ROADMs located at the edges of protected submarine cables may not get any notification for the fiber break, or the automatic reconfiguration of protected channels from one branch to the other.

In this example, the OADM terminal 12 is connected to the OADM terminal 14 via a first path 46 in the foreign-controlled optical network 40. Responsive to a fiber cut 48 in the foreign-controlled optical network 40, traffic on the faulted path 46 can be rerouted on a second path 48, via the OADM terminals 16, 18.

Virtual Module

Figure 2:
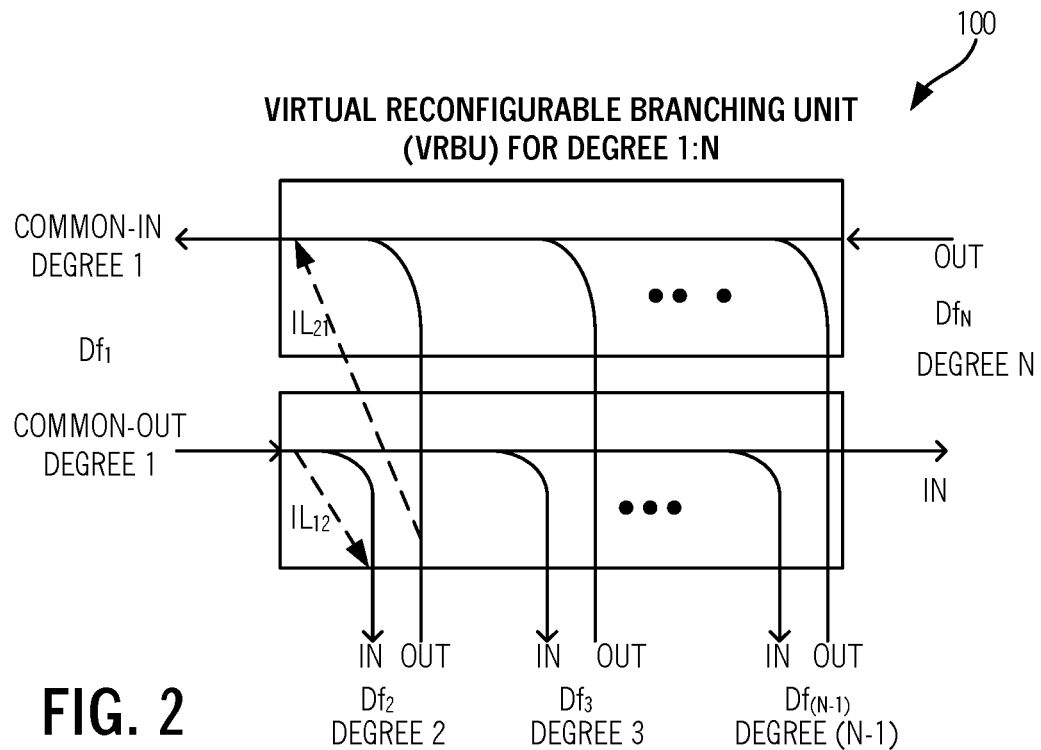
FIG. 2 is a block diagram of a virtual module used to model the foreign-controlled optical network of FIG. 1 at the OADM terminals in accordance with some embodiments of the proposed solution.
Figure 3:
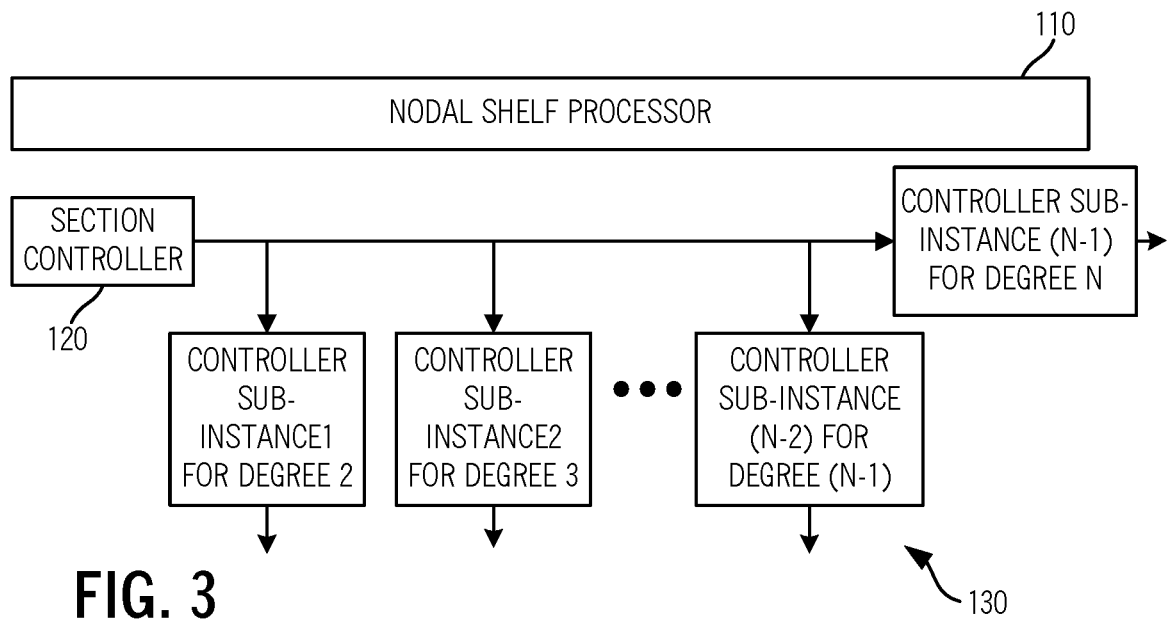
FIG. 3 is a block diagram of a shelf processor at one of the OADM terminals and associated sectional controllers in accordance with some embodiments of the proposed solution.

FIG. 2 is a block diagram of a virtual module 100 used to model the foreign-controlled optical network 40 at the OADM terminals 12, 14. FIG. 3 is a block diagram of a shelf processor 110 at one of the OADM terminals 12, 14, 16, 18 and associated sectional controllers 120. Again, the virtual module 100 can be referred to as a Virtual Reconfigurable Branching Unit (vRBU), a Virtual OADM, etc. The term "virtual" is used in the sense that the virtual module 100 does not exist in a physical node in reality (i.e., at the OADM terminals 12, 14), and instead, it is a software construct to model the functionalities of an actually deployed fixed or reconfigurable optical branching unit 44 in the foreign-controlled optical network 40 that can potentially have no control communication with the OADM terminals 12, 14, or in other words, is foreign-controlled.

The virtual module 100 is configured to model splitting the spectrum from a degree to N number of degrees. Thus, the virtual module 100 for an N degree branching unit 44 represents branching of channels or allocated spectrum per channel from degree 1 to degree n, where n=2, 3, 4, . . . , N, i.e., N degrees, $Df_n$ where n=2, 3, 4, . . . , N. Each degree $Df_n$ includes an input port and an output port and an associated insertion loss ($IL_{xy}$) between degrees x and y. For example, in FIG. 1, the OADM terminal 12 is a two-degree element facing both the OADM terminal 14 and the OADM terminal 16. The virtual module 100 at the OADM terminal 12 is a three-degree module with degree $Df_1$, the common port, facing the OADM terminal 12, with degree $Df_2$, facing the OADM terminal 14 via the first path 46, and with degree $Df_3$, facing the OADM terminal 16. Thus, while the OADM terminal 12 itself is a two-degree node, the corresponding virtual module 100 requires three degrees with the common side facing the OADM terminal 12.

For the virtual module 100, each branching port (in/out ports are expected to have the same spectral range) can be pre-configured for a set of pre-allocated allowable spectral widths, or can be left non-configured (i.e., colorless) that, by default, will support the full traffic carrying spectral range for each branching port. Overall, to ensure a channel branch from one degree (such as degree 1) to another degree (such as degree N), there must be a common spectral range between the two ports. The virtual module 100 model also allows modeling the net or effective path loss between different degrees. In this example, the net loss (IL) can be defined between degree 1 common-out (which will be equivalent to OADM terminal out) to any other degree branching port out, or similarly from any other branching in port to the degree 1 common-in port.

The virtual module 100 can be co-located with the OADM terminals 12, 14, 16, 18 under the same shelf processor 110 so that the branching or channel routing information as modeled by the virtual module 100 can be directly fed to the photonic controllers running at the OADM terminals 12, 14, 16, 18. It is useful to note that the virtual module 100 does not provide any channel add/drop functionality and is responsible for determining and providing channels' appropriate routing information, for the shelf processor 110. The shelf processor 110 can be a module or the like which includes processing elements to execute software instructions. The shelf processor 110 can be configured at the OADM terminals 12, 14, 16, 18 to perform various functions including the virtual module 100 and the sectional controller 120. Those skilled in the art recognize that the shelf processor 110 can perform other Operations, Administration, Maintenance, and Provisioning (OAM&P) functions as well as providing an in-skin control plane.

The shelf processor 110 can execute the sectional controller 120. Again, conventionally with the foreign-controlled optical network 40, the sectional controller 120 operated between the OADM terminals 12, 14 without visibility into the components in the foreign-controlled optical network 40. With the virtual module 100, the shelf processor 110 can break down the sectional controller 120 into multiple logical sub-controllers 130 by defining the virtual tunnels, within which each tunnel can have a plurality of spectral ranges to control and optimize channels. Each virtual tunnel in this case guarantees to have "unchanged" spectral loading and hence, restoring back the fundamental assumptions for the sectional controller 120. The sub-controllers 130, in this case, do become dependent on each other. However, the interdependence is reduced in a submarine optical network where there are channel holders (i.e., dummy channels, loading channels, channel idlers, etc.). For terrestrial networks, the sub-controllers 130 can employ additional synchronization between one another.

The virtual tunnels or topological connectivity can be done as part of initial network installation and provisioning. The virtual tunnels or sub-sections are not automatically discovered but are provisioned, or in other words, told by external discovery agents to the shelf processor 110 and the controllers 120, 130. The virtual modules 100 are executed on the shelf processor 110 to perform the controllers 120, 130. Additionally, the shelf processor 110 is communicatively coupled to the optical spectrum monitor(s) 26 for obtaining optical information for management of the virtual module(s) 100. Additional details of these techniques is provided herein.

Typically, to control the optical channels in an OMS, the sectional controller 120 is dedicated to run per OADM degree per direction, assuming no spectral loading changes will take place within the OMS. In this case, the presence of foreign branching units (BUs) disrupts that assumption. To resolve the disruption, with the virtual module 100 located at the line facing ports of the OADM degree, a sectional controller sub-instance (logical sub-controllers 130) is employed for each outgoing virtual port to control a subset of channels (or spectrum) routed to a far-end nodal degree. Each of these sectional controllers 120 or controller sub-instances (logical sub-controllers 130) against virtual ports has access to per channel power monitoring points via the intra-nodal optical spectrum monitors 26, via external optical spectrum analyzers (OSAs), etc., and can work on monitoring and maintaining per channel target launch powers to the line facing optical fibers, as well as, monitoring the incoming channel powers from the far-end nodal degree. In other words, the virtual module 100 allows a logical split of the OMS into multiple virtual optical sub-sections with dedicated virtual routes between interconnected nodal degrees, where each sectional controller sub-instance (logical sub-controllers 130) remains responsible for all channels routed within that optical sub-section (for monitoring both outgoing and incoming channels).

Also, the virtual module 100 can be used to model any foreign line facing equipment such as co- and counter-propagating Raman amplifiers, dispersion compensation equipment, etc. Such Raman gain coefficients, pump powers, spectral locations for Raman pumps and other factors that can potentially affect the optical transmission characteristics of the foreign-controlled optical network 40 can be added as additional characteristics for each virtual tunnel or route for further improving the modeling of the path.

Virtual Module Process

Figure 4:
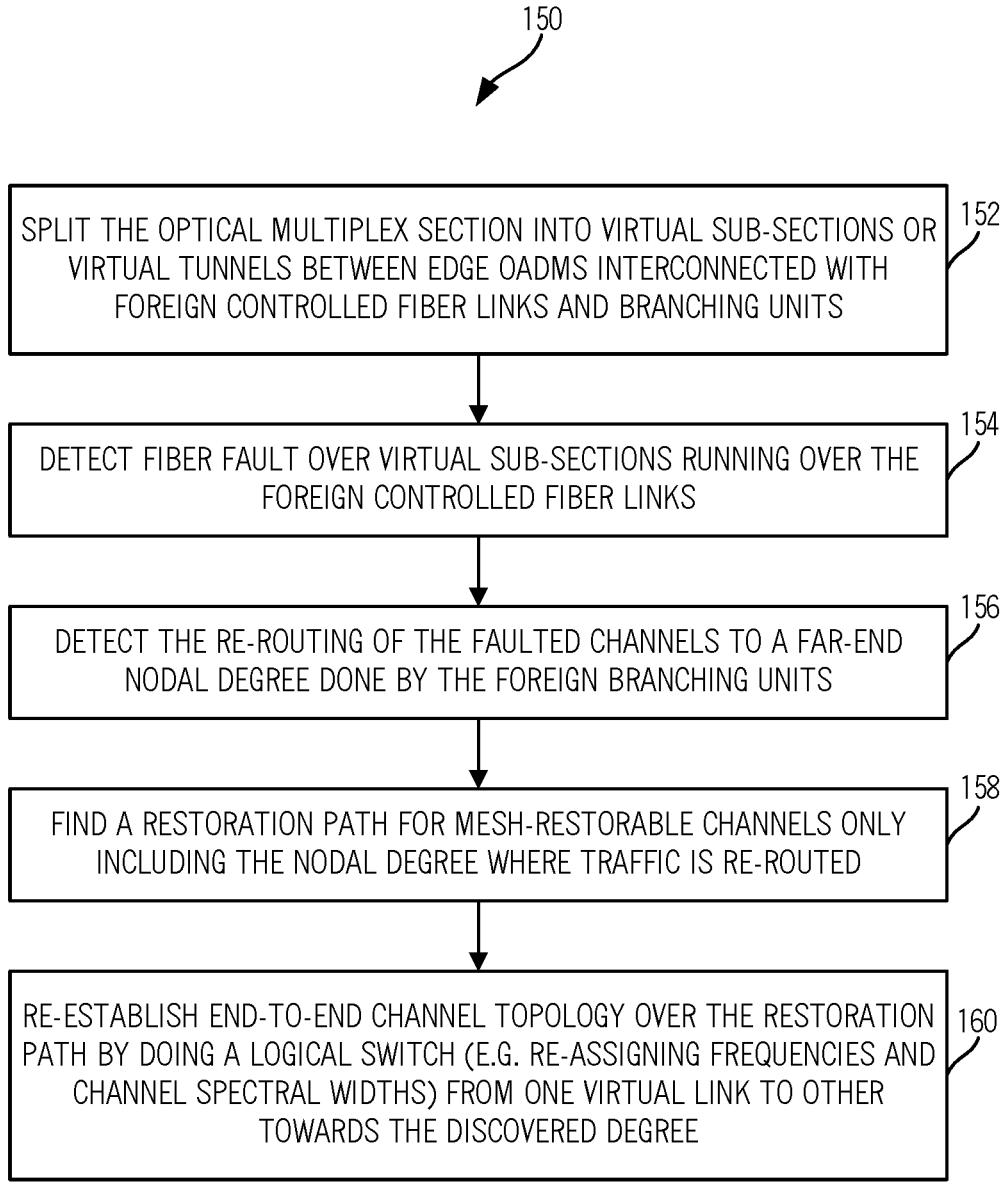
FIG. 4 is a flowchart of a virtual module process implemented by the OADM terminals in accordance with some embodiments of the proposed solution.

FIG. 4 is a flowchart of a virtual module process 150 implemented by the OADM terminals 12, 14. The process 150 includes splitting the OMS into virtual sub-sections or virtual tunnels between edge OADMs interconnected with foreign-controlled fiber links and branching units (152). The virtual module 100 is used to split and model the OMS into the virtual sub-sections or virtual tunnels. The process 150 includes detecting a fiber fault over the virtual sub-sections running over the foreign-controlled fiber links (154). The detection is performed based on the shelf processor 110 analyzing data from the optical spectrum monitor 26 as is described herein. The process 150 includes detecting the re-routing of the faulted channels to a far-end nodal degree performed by the foreign branching units (156). Again, this detection is performed by the shelf processor 110 analyzing data from the optical spectrum monitor 26.

The process 150 includes finding a restoration path for mesh-restorable channels only including the nodal degree where the traffic is re-routed (158). Finally, the process 150 includes re-establishing an end-to-end channel topology over the restoration path by performing a logical switching action (e.g., re-assigning frequencies and channel spectral widths) from one virtual link to other towards the discovered degree (160). Here, this logical switch is performed in the virtual module 100.

Following the detection and alarming the fault on foreign-controlled link(s), the process 150 also allows the control plane to correlate channel powers showing up above an expected level for all channels within a virtual link at the starting and receiving end of that virtual link and that helps the control plane to re-discover the topology over the foreign-controlled fiber links and to re-establish the end-to-end restoration path for targeted mesh-restorable channels.

The process 150 and the virtual module 100 enables network-wide fault isolation and the correlation between a control plane (executed between the edge OADM terminals 12, 14) and the foreign-controlled optical network 40. For a terrestrial network, this isolation and correlation is done by analyzing output from the optical spectrum monitors 26. However, this is more complex in submarine optical networks where the amplifiers 42 can be Total Output Power (TOP) controlled. The shelf processor 110 can perform cross-correlations at the start and the end of such links to isolate a fault against a virtual tunnel within the foreign-controlled optical network 40.

Optical Network with Virtual Modules

Figure 5:
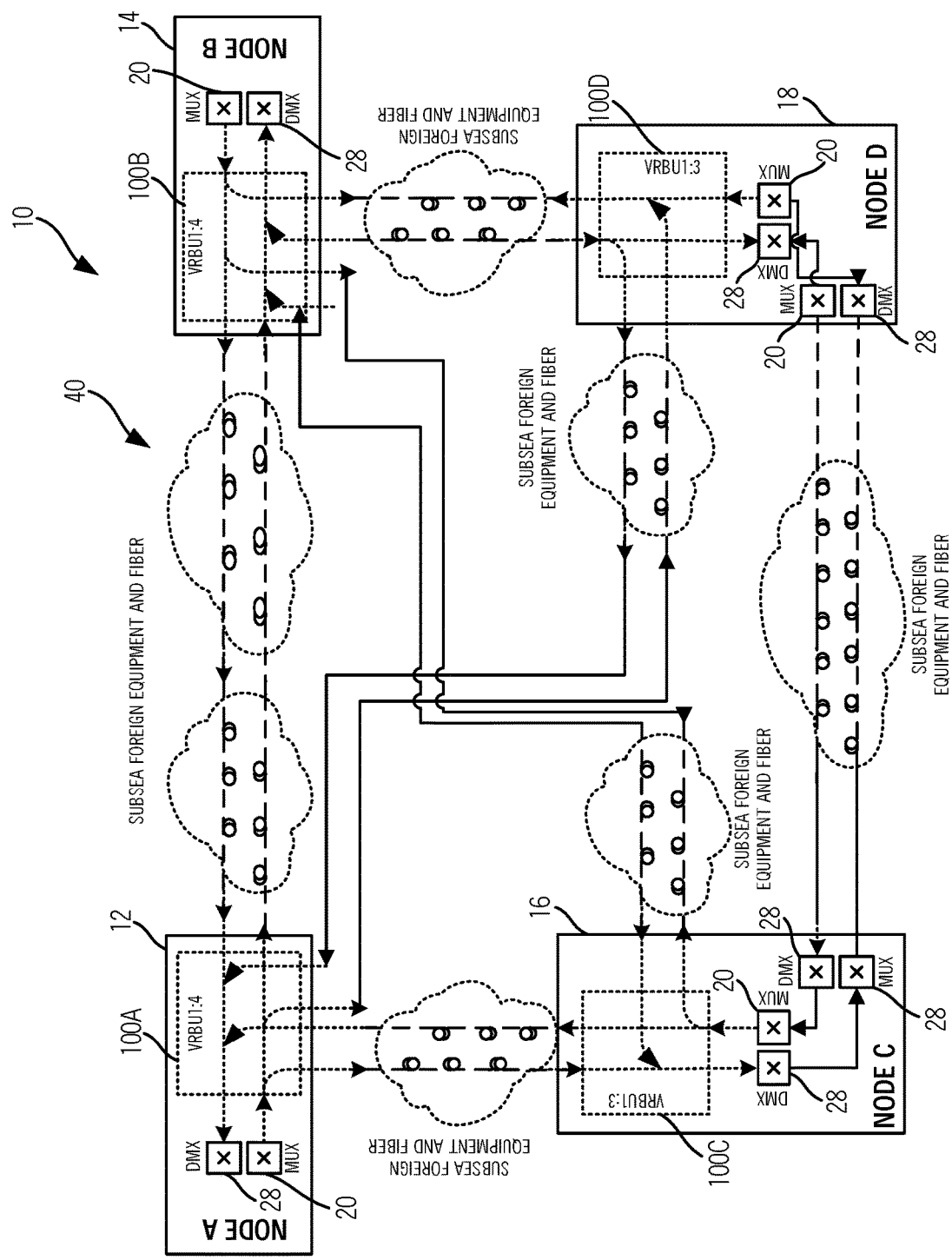
FIG. 5 is a network diagram of the submarine optical network with the virtual modules included therein in accordance with some embodiments of the proposed solution.

FIG. 5 is a network diagram of the submarine optical network 10 with the virtual modules 100 (labeled as virtual modules 100A, 100B, 100C, 100D) included therein. The virtual modules 100A, 100B, 100C, 100D are labeled in FIG. 5 as vRBU 1:4 or vRBU 1:3, i.e., a four-degree (1:4) or three-degree (1:3) vRBU. The virtual modules 100 are designed to be located at the line facing ports of the OADM degrees at each end of the submarine cable or at each end of the fiber cable containing foreign controlled photonic components. Of note, FIG. 5 is the same network as FIG. 1 with the virtual modules 100A, 100B, 100C, 100D included at the OADM terminals 12, 14, 16, 18.

In this four-node example network 10 (i.e., the OADM terminals 12, 14, 16, 18), there are two foreign controlled three-way optical branching units 44 (not shown) between the OADM terminals 12, 14 that are providing reconfigurable or fixed channel routing between:

| Routing between OADM terminals |
|---|
| OADM terminal 12 and OADM terminal 14 |
| OADM terminal 12 and OADM terminal 16 |
| OADM terminal 12 and OADM terminal 18 |
| OADM terminal 14 and OADM terminal 16 |
| OADM terminal 14 and OADM terminal 18 |

Note that in this example, there is no branching unit between the OADM terminals 16, 18, although they are connected with foreign-controlled photonic components. In order to model the channel routing between the above-mentioned branches, the virtual modules 100A, 100B, 100C, 100D are provisioned at the line facing ports of the OADM terminals 12, 14, 16, 18 that are originally facing the physical foreign controlled branching units.

For example, a virtual module 100A (vRBU1:4) is provisioned at the OADM terminal 12 line facing in/out ports to represent the channel routing to the OADM terminals 14, 16, 18. A similar virtual module 100B (vRBU1:4) is provisioned at the OADM terminal 14 to represent channel routing options to the OADM terminals 12, 16, 18, and the virtual modules 100C, 100D (vRBU1:3) is provisioned at each of the OADM terminals 16, 18 to represent channel branching to the OADM terminals 12, 14.

Since each virtual module 100 creates multiple virtual ports at the output of a single OADM degree that represents adjacent connections to multiple far end nodes, it becomes easier to map channel routing from that degree to any another node by simply pointing logical per channel cross-connects from the source or originating add/drop ports to the one of the virtual branching ports that, in turn, also helps to validate per channel spectrum information against the pre-configured routing capability of each virtual module 100 port. Each virtual module 100 also helps to logically split the OMS into a plurality of sub-section controller instances—one for each virtual tunnel or link associated with each virtual port.

Figure 6:
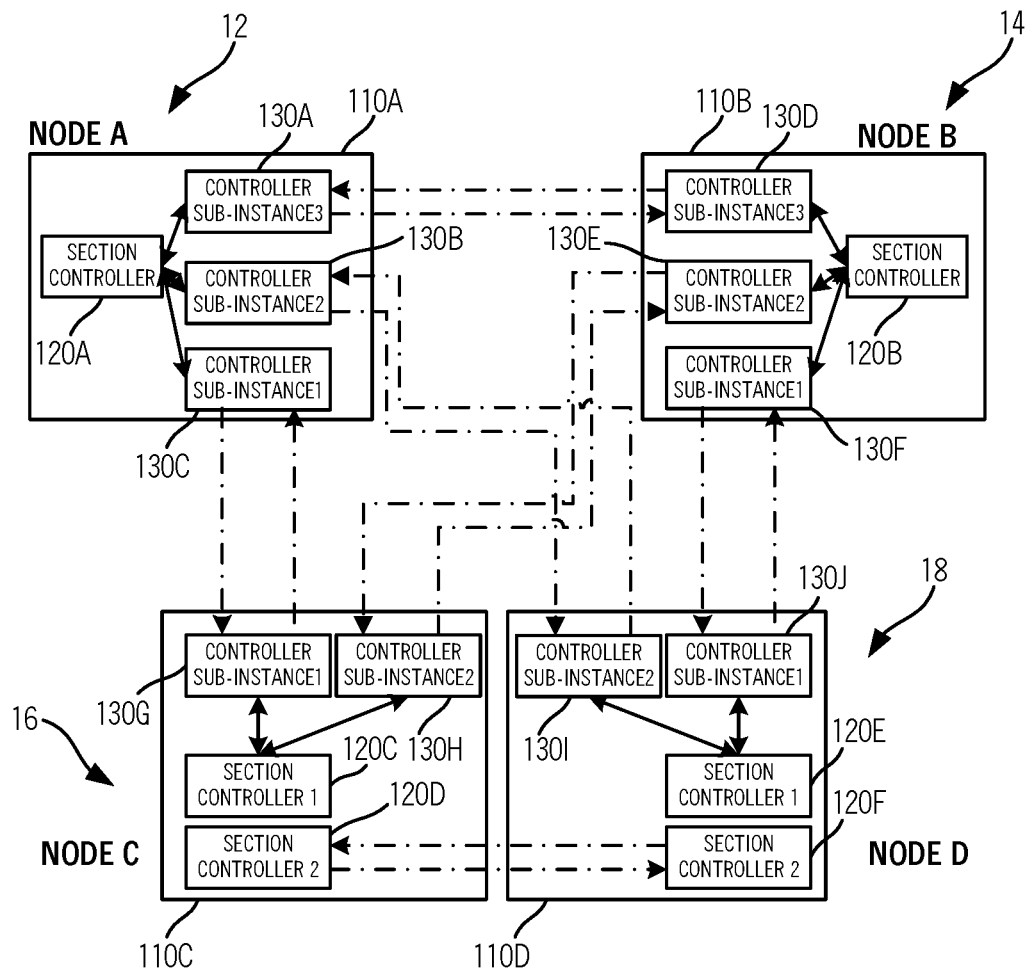
FIG. 6 is a block diagram of the sub-sectional controller instances and virtual link mapping for the network in FIG. 5 with the virtual modules in accordance with the proposed solution.

FIG. 6 is a block diagram of the sub-sectional controller instances and virtual link mapping for the network 10 in FIG. 5 with the virtual modules 100. Specifically, FIG. 6 illustrates a shelf processor 110 (labeled as 110A, 110B, 110C, 110D) at each of the OADM terminals 100A, 100B, 100C, 100D. Each shelf processor 110 includes a sectional controller 120 (labeled as 120A, 120B, 120C, 120D, 120E, 120F). The sectional controller 120A at the OADM terminal 12 controls optical links facing the OADM terminals 14, 16, 18 and has associated controller sub-instances 130A, 130B, 130C. The sectional controller 120B at the OADM terminal 14 controls optical links facing the OADM terminals 12, 16, 18 and has associated controller sub-instances 130D, 130E, 130F. The sectional controllers 120C, 120D operate at the OADM terminal 16 and the sectional controllers 120E, 120F operate at the OADM terminal 18. The sectional controllers 120D, 120F have no controller sub-instances as this optical link has no branching. The sectional controller 120C has associated controller sub-instances 130G, 130H, and the sectional controller 120E has associated controller sub-instances 130I, 130J.

From the perspective of the OADM terminal 12, the virtual module 100A faces each of the OADM terminals 14, 16, 18 and the virtual module 100A is initially provisioned with the associated traffic flow therebetween. However, during operation, the OADM terminal 12 is unaware of the connectivity to the OADM terminals 14, 16, 18 since there is no in-band or out-of-band communication between the OADM terminal 12 and the foreign-controlled optical network 40 between the OADM terminals 12, 14, 16, 18. The virtual module 100A along with the associated controller sub-instances 130A, 130B, 130C are configured to detect faults and reconfiguration and to provide such information to higher-layer control, i.e., the control plane.

Fault Detection Process

Figure 7:
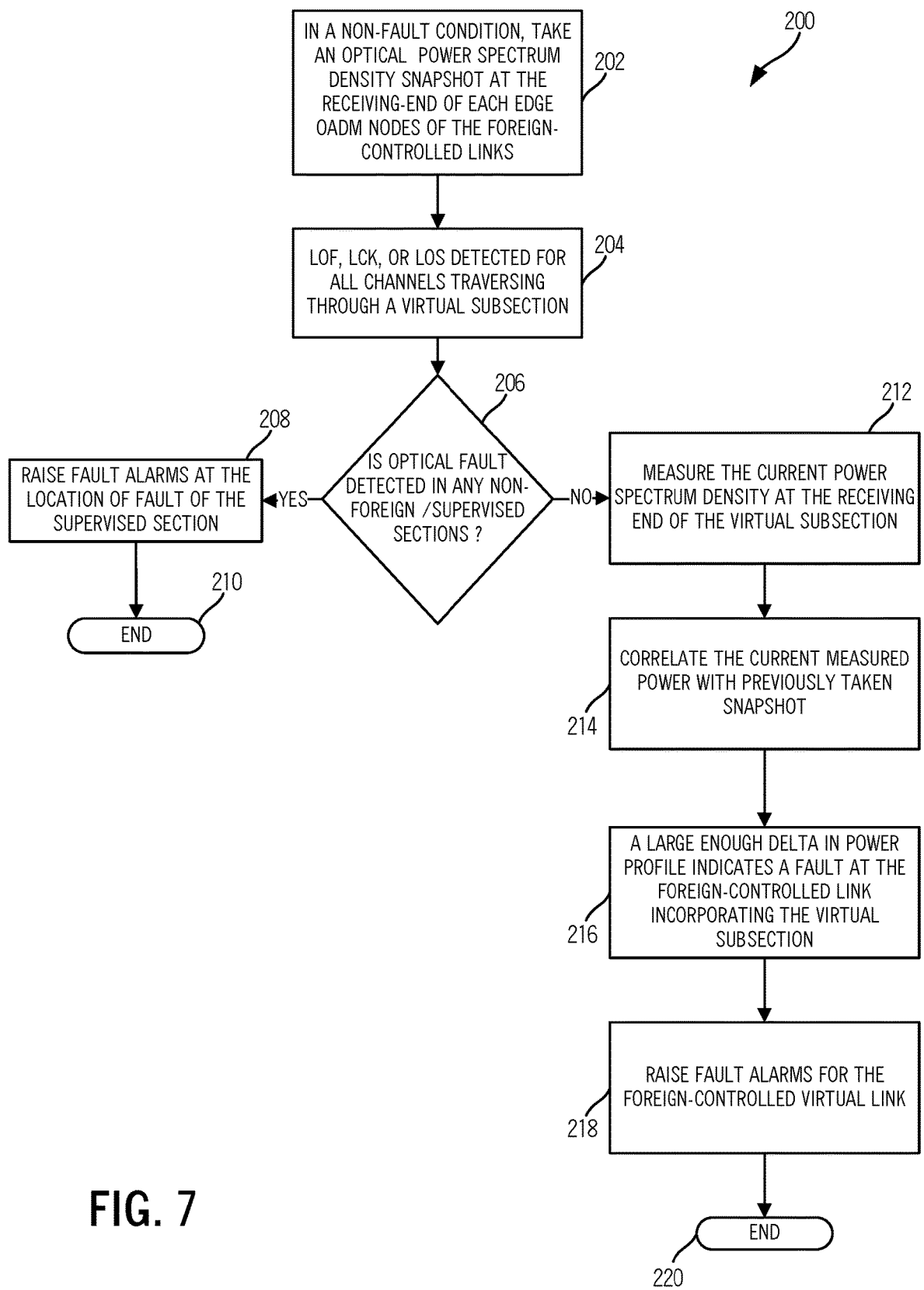
FIG. 7 is a flowchart of a fault detection process over foreign-controlled optical links in accordance with some embodiments of the proposed solution.

FIG. 7 is a flowchart of a fault detection process 200 over foreign-controlled optical links. Since the foreign-controlled optical branching units may not provide the automatic channel re-routing info from one branch to the next in case of a fiber fault, for such configuration, it is important that the sectional controllers 120 provide a mechanism not only to detect fiber faults but also to re-discover the channels' automatic re-routing to a far-end degree so that the overall end-to-end channel topology between source and destination OADM terminals, involving diverse routes can be re-built. The process 200 can be implemented by the shelf processor 110 and run as part of a centralized or distributed control plane, along with communication to adjacent shelf processors 110 and to a local optical spectrum monitor 26.

In order to detect the fiber fault in the foreign-controlled optical network 40, the adjacent sectional controller sub-instances 130 coordinate with each other via a centralized or distributed control plane (and hence via messaging using either an OSC or other forms of out-of-band or in-band communication channels). For example, in FIG. 6, the controller sub-instances 130A, 130D communicate with one another, the controller sub-instances 130B, 130I communicate with one another, etc.

In a non-fault condition in the network that is, when there is no Loss of Clock (LCK), Loss of Signal (LOS), or Loss of Frame (LOF) on any channels traversing over the foreign-controlled links, the process 200 includes taking a power spectral density snapshot for the optical band at the receiving end of each OADM nodes of the foreign-controlled links (202). This snapshot can be through the optical spectrum monitor 26 and can be saved as a good or expected power profile snapshot in the local node shelf processor 110 for future use.

When the LOS, LCK, or LOF is detected for at least one (multiple/most/all) channels going through a virtual subsection link (204), the process 200 includes checking if there is an optical line fault or common equipment fault detected for any of the supervised sections within the faulted path (206). Specifically, the shelf processor 110 can also communicate to optical transceivers at the OADM terminal for purposes of notification of any LOS, LCK, or LOF. Here, the supervised sections are visible to the OADM terminal and associated shelf processor 110, i.e., the fault is not in the foreign-controlled optical network 40, and the proper alarms are raised at the faulted locations in the supervised sections for debugging purposes (208) and the process 200 ends (210).

If there is no fault detected for supervised sections along the path (206), a new power profile snapshot is measured at the receiving end of each OADM nodes over the foreign-controlled links, and then correlated with the previously taken "expected" power profile snapshot. Specifically, the process 200 includes measuring the current power spectrum density at the end of the virtual subsection, via the optical spectrum monitor 26 (212) and correlating the currently measured power with the previously taken snapshot (214)

A large enough delta (such as >±X dB) for multiple/most/ all channels within the virtual link, or in general a correlation offset between the two power profiles at any OADM node can indicate a fault over the foreign-controlled link (216). An alarm will be raised to indicate the fault over the link (218). Note that, since submarine links often run TOP (total output power) controlled optical amplifiers, a typical fiber fault drives those amplifiers to generate substantial amount of ASE at the receiving end of the link that may not indicate a clear power delta for all channels within the link, and that is why, a cross-correlation between two power profiles is expected to indicate better anomaly, and hence, the fault over the foreign-controlled submarine link. If this is a terrestrial link where typically amplifiers operate in gain-controlled mode (i.e., always maintaining a target ratio between total input and total output power), a typical fiber fault shuts down the amplifiers due to laser eye safety reasons, and in such case, the faulted power profile is expected to be much lower in power spectral density level compared to the previously taken good profile. An example of such fault power snapshot for both submarine and terrestrial links is presented in FIGS. 8A-8C.

Restoration Route Discovery

Since based on a fiber fault, the foreign-controlled BUs can reroute optical channels on their own towards one of the available directions, in this case, the systems and methods allow the control plane to apply similar per channel integrated power (or power spectral density level) coordination logic between the start and end of each available virtual links. That is, before initiating a network wide restoration action, the control plane initially applies a discovery mechanism to check which non-faulted virtual links have channel powers visible for all faulted channels from one of the faulted virtual links. In this case, if channel powers for all channels from one of the faulted virtual link shows up on another non-faulted virtual link at a power level higher than an expected threshold, then the control plane discovers the new virtual link for restoration, and does a logical switch from the faulted virtual link to the new one over the foreign-controlled link, via the virtual module 100. At this point, the control plane re-discovers an end-to-end restoration route over the network, including the newly discovered virtual link and the nodal degree and re-establishes the channel routing topology and hence, the traffic. Note that, although the foreign-controlled optical branching units may re-route all channels from the faulted fiber to another branch, the presence of virtual modules 100 and its coordination with control plane only allows to provide restoration and re-built end-to-end channel topology only for channels that have a policy of mesh-restorable services.

Network Example

Figure 8A:
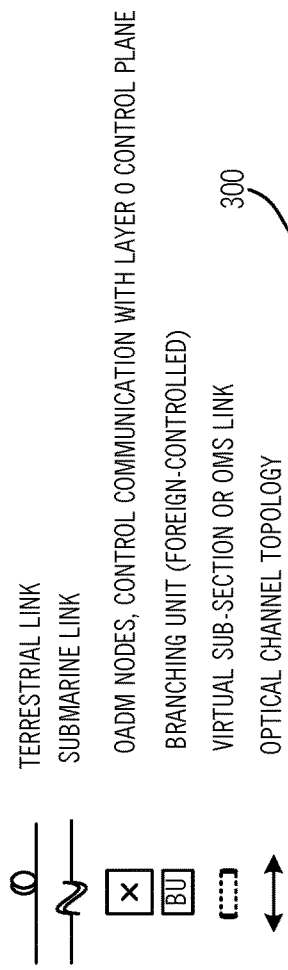
FIGS. 8A, 8B, and C illustrate a network showing an example of fault detection and restoration using the systems and methods described herein.
Figure 8A:
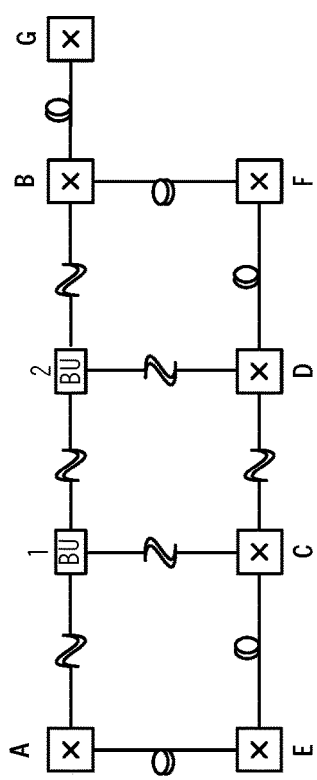
Figure 8B:
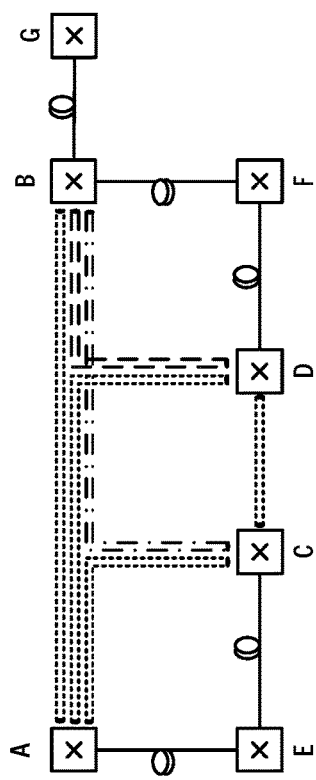
Figure 8C:
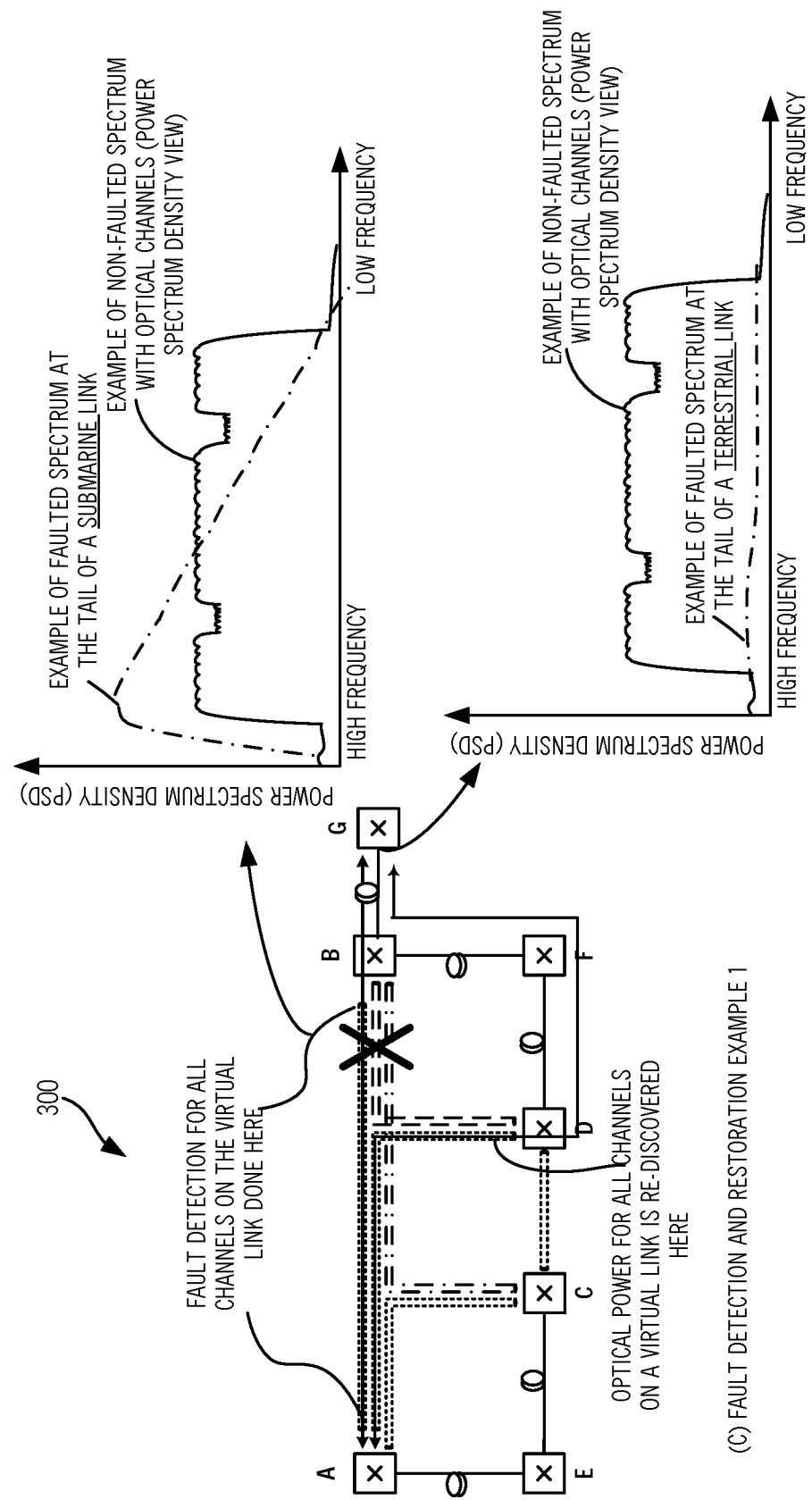

FIGS. 8A, 8B, and 8C illustrate a network 300 showing an example of fault detection and restoration using the systems and methods described herein. A key is shown next to FIG. 8A for terrestrial links, submarine links, OADM nodes, BUs, virtual sub-section/OMS link, and optical channel topology. The network 300 includes OADM nodes A, B, C, D, E, F, G and BUs 1, 2 with a mixture of terrestrial links and submarine links. FIG. 8A illustrates the network 300 topology and FIG. 8B illustrates the virtual OMS link mapping via the vRBUs (virtual modules 100).

In order to identify proper channel routing, fault detection, and restoration, using the virtual module 100 model, foreign-controlled submarine links are mapped into multiple virtual links as illustrated in FIG. 8B. The links with no BU (such as the submarine link between the OADM nodes C, D) can be modeled with a vRBU1:1 for consistency with other links and can be left, for example, with one possible virtual link.

A fault condition is presented in FIG. 8C. Here, the channels were originally routed between OADM nodes A, B using the top virtual link on the route between the OADM nodes A, B, G. When the fiber fault takes place in the foreign-controlled link between the OADM nodes A, B in the designated location (between BU #2 and the OADM node B) as identified in FIG. 8C, LOF/LCK will be detected for all channels on that virtual link. The control plane determines that there is no optical fault detected on the supervised terrestrial link between the OADM nodes B, G, and triggers a cross-correlation between power profile snapshots taken during a non-fault time and the current snapshots, and confirms a change in spectral power shapes over the submarine link, that in turn, confirms a fiber fault for that virtual link, and raises proper alarms for each faulted link.

In the example of FIG. 8C, the foreign-controlled BU #2 triggers a branching action for all channels going to the OADM node B towards the OADM node D. The control plane applies the restoration route discovery mechanism to detect expected channels powers for all channels on the faulted virtual link to the new link associated with the OADM node D. The control plane triggers a logical switch from the virtual link A-B to A-D and re-establishes the restoration route over the OADM nodes A-D-F-B-G that includes the newly discovered virtual link between the OADM nodes A, D.

In the given examples, once the new re-routed nodal degree is known, the control plane finds a restoration route for mesh-restorable channels between the source and destination pair, assuming no change in color is required for channels to complete restoration. Note that not every channel automatically re-routed by the foreign-controlled branching units may have the mesh-restorable capability, and, in this case, the control plane provides mesh-restoration only for channels that have the pre-defined mesh-restoration settings. If a color change is required, the control plane either finds the next available spectral slot for the channel over the restoration route knowing the supported spectral ranges for the foreign branching units for different branches. In the case of no pre-defined spectral range knowledge for the foreign-branching units and assuming a color change is required to find a restoration route due to constraints over the other links, the control plane has to keep trying next available spectral slots on available restoration routes until the restoration becomes successful. Regardless, the control plane uses the virtual module 100 provided virtual degree ports to do the logical switching from one virtual route to another to re-establish the end-to-end channel topology for mesh-restorable channels.

ALTERNATE EMBODIMENTS

Instead of using the virtual module 100, it is also possible to create virtual sub-ports or logical ports for each line facing OADM degree ports that can provide the same functionality as offered by the virtual module 100, except the option of provisioning net fiber loss from one-degree port to next.

Without the virtual module 100, another option would be to model the full branching unit in both directions or one direction as a far-end virtual node with a virtual shelf-processor and provision that virtual node during network install time in order to split the physical submarine link into separate virtual sections. This idea will work as well assuming all virtual node placements can be accommodated in a centralized server to coordinate with edge OADM nodes. This same functionality can be implemented at a remote, far end node.

Again, the submarine optical network is described herein due to its specialty of having foreign-controlled active photonic equipment in the middle of the link without having supervisory communication with edge OADM nodes and control planes. The systems and methods can be equally employed for terrestrial links with open, reconfigurable OADM concepts, where edge OADM nodes can belong to one vendor, while the internal branching units can belong to other vendors.

With respect to the shelf processor 110, it will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer readable code stored thereon for programming a device to perform steps of:
obtaining and storing a first power spectral density snapshot of an optical link, from an optical spectrum monitor and when the optical link is in a non-fault condition;
responsive to detection of a fault on at least one channel traversing the optical link based on a received notification, obtaining a second power spectral density snapshot at a receiving end of the optical link;
analyzing the first power spectral density snapshot and the second power spectral density snapshot via cross-correlation: and
determining the fault is on the optical link based on the analyzing;
wherein the optical link is a foreign-controlled link.

2. The non-transitory computer-readable storage medium of claim 1, wherein the computer readable code further programs the device to perform steps of
causing an alarm to be raised based on the determined fault.

3. The non-transitory computer-readable storage medium of claim 1, wherein the analyzing measures a power difference between the first power spectral density snapshot and the second power spectral density snapshot, and the determining is based on the power difference being above a threshold.

4. The non-transitory computer-readable storage medium of claim 1, wherein the first power spectral density snapshot is obtained from each edge node of the optical link.

5. The non-transitory computer-readable storage medium of claim 1, wherein the received notification is from a shelf processor that has detected any of a Loss of Frame (LOF), a Loss of Signal (LOS), and a Loss of Clock (LOC) on the at least one channel.

6. The non-transitory computer-readable storage medium of claim 1, wherein photonic components associated with the optical link have no in-band or out-of-band supervisory communication between the photonic components and edge nodes forming the optical link.

7. The non-transitory computer-readable storage medium of claim 1, wherein the optical link is a submarine link.

8. An apparatus comprising:
a processor communicatively coupled to an optical spectrum monitor, wherein memory storing instructions that, when executed, cause the processor to
obtain and store a first power spectral density snapshot of an optical link, from the optical spectrum monitor and when the optical link is in a non-fault condition,
responsive to detection of a fault on at least one channel traversing the optical link based on a received notification, obtain a second power spectral density snapshot at a receiving end of the optical link,
analyze the first power spectral density snapshot and the second power spectral density snapshot via cross-correlation, and
determine the fault is on the optical link based on the analyze;
wherein the optical link is a foreign-controlled link.

9. The apparatus of claim 8, wherein the instructions that, when executed, further cause the processor to
cause an alarm to be raised based on the determined fault.

10. The apparatus of claim 8, wherein the first power spectral density snapshot and the second power spectral density snapshot are analyzed by a power difference measurement between the first power spectral density snapshot and the second power spectral density snapshot, and the fault is determined based on the power difference being above a threshold.

11. The apparatus of claim 8, wherein the first power spectral density snapshot is obtained from each edge node of the optical link.

12. The apparatus of claim 8, wherein the received notification is from a shelf processor that has detected any of a Loss of Frame (LOF), a Loss of Signal (LOS), and a Loss of Clock (LOC) detected on the at least one channel.

13. The apparatus of claim 8, wherein photonic components associated with the optical link have no in-band or out-of-band supervisory communication between the photonic components and edge nodes forming the optical link.

14. The apparatus of claim 8, wherein the optical link is a submarine link.

15. A method comprising:
   obtaining and storing a first power spectral density snapshot of an optical link, from an optical spectrum monitor and when the optical link is in a non-fault condition;
   responsive to detection of a fault on at least one channel traversing the optical link based on a received notification, obtaining a second power spectral density snapshot at a receiving end of the optical link;
   analyzing the first power spectral density snapshot and the second power spectral density snapshot cross-correlation; and
   determining the fault is on the optical link based on the analyzing;
   wherein the optical link is a foreign-controlled link.

16. The method of claim 15, further comprising
   causing an alarm to be raised based on the determined fault.

17. The method of claim 15, wherein the analyzing measures a power difference between the first power spectral density snapshot and the second power spectral density snapshot, and the determining is based on the power difference being above a threshold.

18. The method of claim 15, wherein the first power spectral density snapshot is obtained from each edge node of the optical link.

19. The method of claim 15, wherein the received notification is from a shelf processor that has detected any of a Loss of Frame (LOF), a Loss of Signal (LOS), and a Loss of Clock (LOC) detected on the at least one channel.

20. The method of claim 15, wherein photonic components associated with the optical link have no in-band or out-of-band supervisory communication between the photonic components and edge nodes forming the optical link.

* * * * *